United States Patent [19]

Kikuchi et al.

[11] Patent Number: 4,580,257
[45] Date of Patent: Apr. 1, 1986

[54] DUAL DRIVE SYSTEM FOR PHONO PICKUP ARM

[75] Inventors: Takashi Kikuchi; Shinya Takahashi; Masao Ono; Toshio Hirano; Atsuo Ikeda; Kunio Abe, all of Saitama, Japan

[73] Assignee: Pioneer Electronic Corporation, Tokyo, Japan

[21] Appl. No.: 458,591

[22] Filed: Jan. 17, 1983

[30] Foreign Application Priority Data

Jan. 18, 1982 [JP] Japan ..................................... 57-5522

[51] Int. Cl.$^4$ .......................... G11B 3/38; G11B 17/06
[52] U.S. Cl. .................................... 369/221; 369/41; 369/75.2; 369/219
[58] Field of Search ................. 369/41, 215, 219, 221, 369/223, 224

[56] References Cited

U.S. PATENT DOCUMENTS

| | | | |
|---|---|---|---|
| 3,697,087 | 10/1972 | Takahashi | 369/216 |
| 4,150,833 | 4/1979 | Yamamura | 369/219 |
| 4,184,688 | 1/1980 | Omura et al. | 369/226 |
| 4,310,918 | 1/1982 | Hirata | 369/225 |
| 4,342,108 | 7/1982 | Kitamura et al. | 369/221 |
| 4,375,093 | 2/1983 | Takahashi | 369/41 |
| 4,408,311 | 10/1983 | Suzuki et al. | 369/219 |

Primary Examiner—Steven L. Stephan
Attorney, Agent, or Firm—Sughrue, Mion, Zinn, Macpeak & Seas

[57] ABSTRACT

A dual drive system for an automatic record player of a type in which programmed music selection can be carried out. The drive system includes a mechanical first drive system for mechanically driving the pickup arm and an electromagnetic second drive system for driving the pickup arm using an electromagnetic force. Circuitry is provided for selecting between the two drive systems in accordance with the selected operational mode of the player or the position of the pickup arm.

15 Claims, 27 Drawing Figures

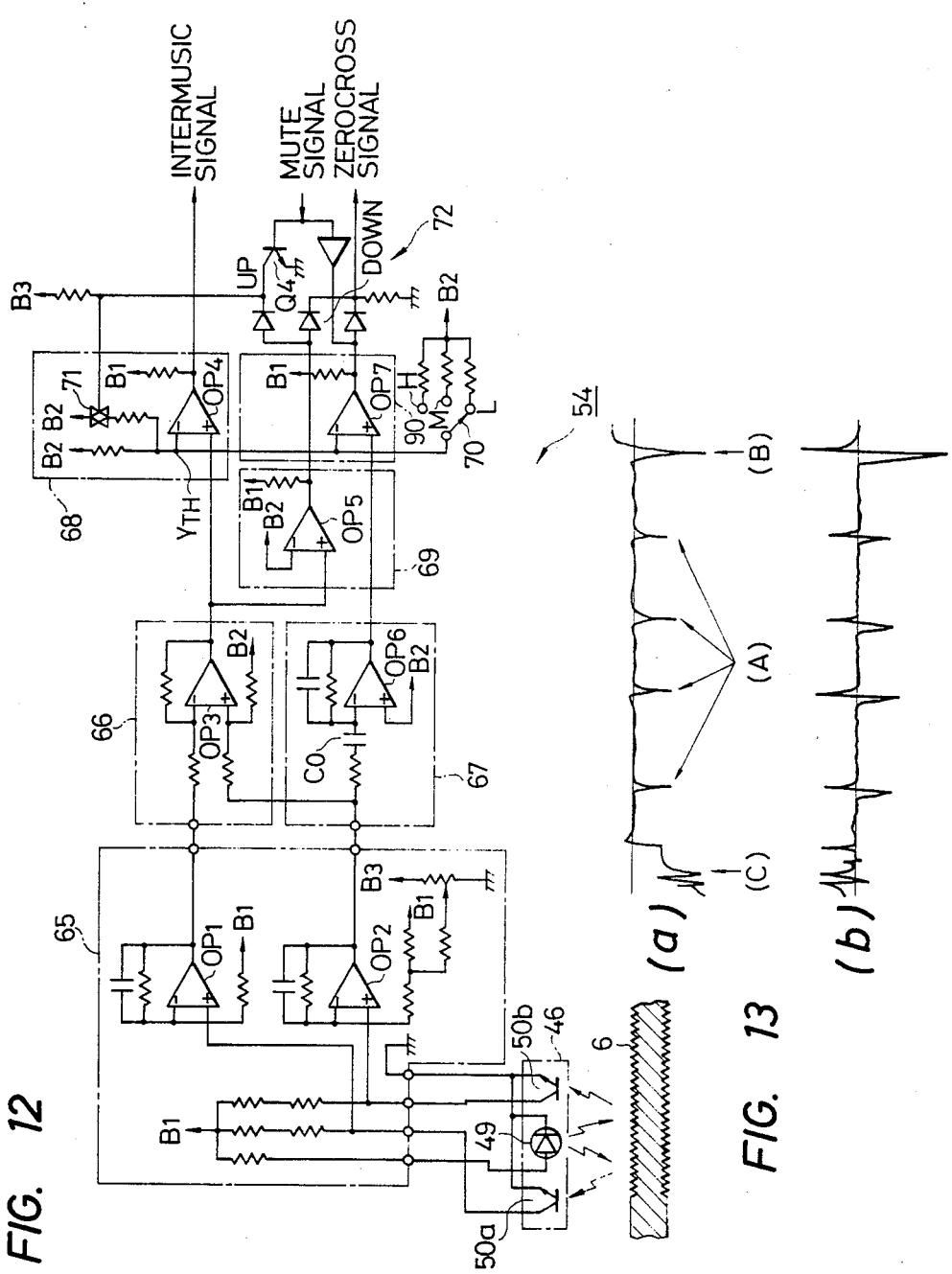

DUAL DRIVE SYSTEM FOR PHONO PICKUP ARM

BACKGROUND OF THE INVENTION

The invention pertains to a drive system for the pickup arm of a record player.

More particularly, the invention pertains to a dual drive system for an automatic-type record player in which programmed music selection can be carried out.

A prior art record player pickup arm drive system of the same general type to which the invention pertains is described in U.S. Pat. No. 4,230,324. The prior art record player described therein is provided with a single electric motor for rotating the pickup arm. With this system, it has been found to be difficult to carry out a searching operation for an address on the record at a high speed and to carry out an intermusic searching operation at a low speed.

Further, it has known in the art to assign addresses on the record being played to identify positions of particular songs on the record. Such a method, however, has been found to be disadvantageous in that a large number of address memories are required.

It is the object of the invention to overcome these disadvantages.

SUMMARY OF THE INVENTION

In accordance with the above and other objects of the invention, there is provided a dual drive system for the pickup arm of a record player including a mechanical first drive system for driving the pickup arm, an electromagnetic second drive system for driving the pickup arm, and means for selectively activating one of the first and second drive systems in accordance with one of a selected operational mode and a position of the pickup arm.

BRIEF DESCRIPTION OF THE DRAWINGS

FIG. 12 is a circuit diagram showing a preferred embodiment of the intermusic sensor assembly;

FIG. 13 is a waveform diagram related to the circuit of FIG. 12;

DESCRIPTION OF THE PREFERRED EMBODIMENTS

Figure 1A:
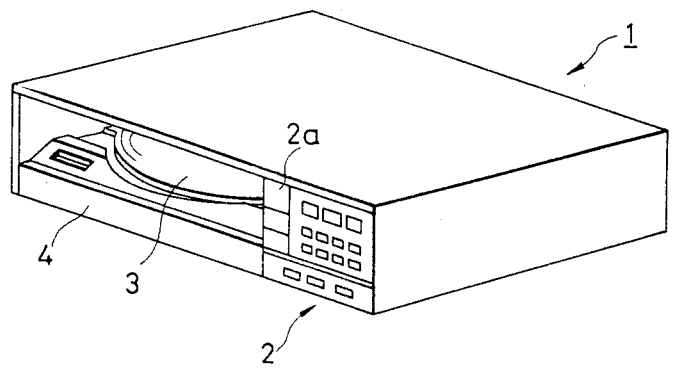
FIGS. 1A and 1B are perspective views of a record player of the invention in closed and open positions, respectively.
Figure 1B:
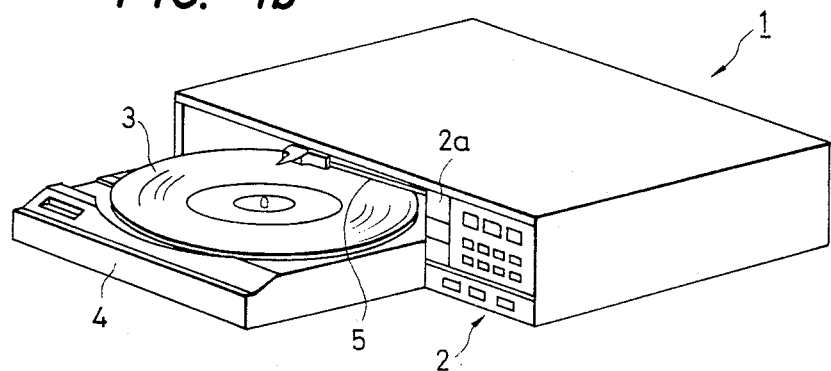

The invention will now be described in detail with reference to the accompanying drawings. FIG. 1A is a perspective view of a record player of the present invention shown in a closed condition. FIG. 1B shows the same record player in the open condition. As is clearly shown by FIGS. 1A and 1B, the record player of the present invention is provided with a mechanism which enables a record to be set on a turntable when the turntable is positioned in the open condition at the front of the main body or case of the record player. (This type of construction is termed a "front-loading record player".)

More specifically, the turntable 3 is mounted on a slide base 4. By sliding the turntable 3 on the slide base 4, the turntable 3 can be made to protrude from the case of the record player 1 for placing a record to be played thereon. This may be done automatically by pressing an OPEN/CLOSE key 2a provided on an operating panel 2 on the front face of the record player case. From the open condition, the turntable 3 can be moved backwardly into the case by again pressing the OPEN/CLOSE key 2a after a record has been placed on the turntable 3.

In the closed condition as shown in FIG. 1A, fully automatic playing is provided. This mode includes programmed selection of music, that is, of individual songs or other selections on a record. On the other hand, in the open condition shown in FIG. 1B, manual operation can be achieved.

A door (not illustrated) is provided at the front of the case. This door opens and closes due to an interlock arrangement with the base 4.

A pickup arm 5 has a base portion mounted at the rear end of the slide base 4. This arrangement not only permits a reduction in the width of the slide base 4, but also enables a record to easily be placed on the turntable 3.

Figure 2:
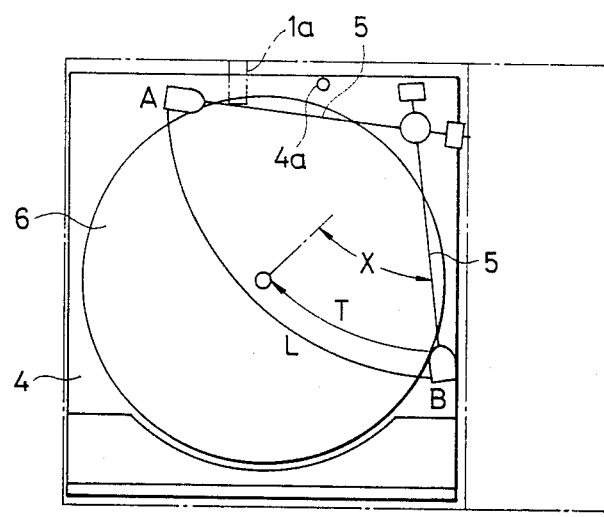
FIG. 2 is a top view of the player of FIGS. 1A and 1B.

The pickup arm 5, as illustrated in FIG. 2, can swing through a total arc of L. An arc of X is used for the playing of the disc, including movement through the lead-in groove. The arm 5 moves in a direction T during the actual playing of music on the record. The pickup arm is, in accordance with the invention, selectively drivable from its rest position (indicated by reference character A) to the position at the end of the arc X (indicated by reference character B) in an indicated direction L by either one of two drive systems. The first drive system, which is hereinafter referred to as the mechanical drive system, drives the pickup arm using a mechanical arrangement. The second drive system, hereinafter referred to as a DD (Direct Drive) drive system, employs an electromagnetic arrangement for moving the pickup arm 5.

An arm stop on abutment 1a is provided for stopping the pickup arm 5 at its rest position A. For storage, the pickup arm 5 is attached to the stop abutment 1a and the slide base 4 is set in the closed position. In this position, as will be described in more detail below with reference to FIG. 3, a pin member 12, which is fixed to a pickup plate 27 and is driven by the mechanical drive system 7, is held on a swing arm 14 against the force of a spring 30 interposed between the plate 27 and a magnet holder 28. When the slide base 4 moves forwardly, the pin member 12 is released from the swing arm 14 to thus release the pickup arm 5 from the abutment 1a. The pickup arm 5 further pivotally rotates in the clockwise direction until it is brought into abutment with the arm stop 4a. This arrangement allows a record to be set on and removed from the turntable without interference with the pickup arm 5. Also, the amount of space required in the case of the record player is reduced.

Figure 3:
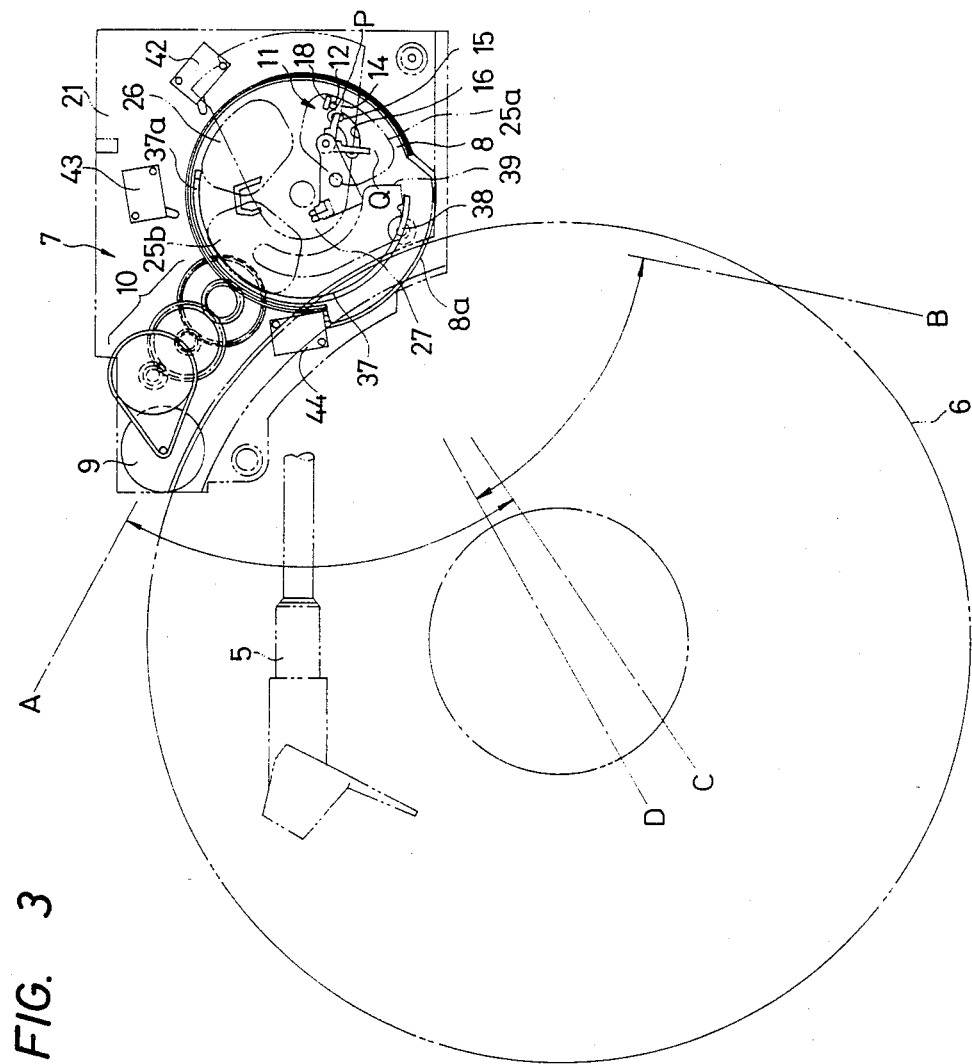
FIG. 3 is a top view showing a pickup arm drive mechanism of the invention.
Figure 4:
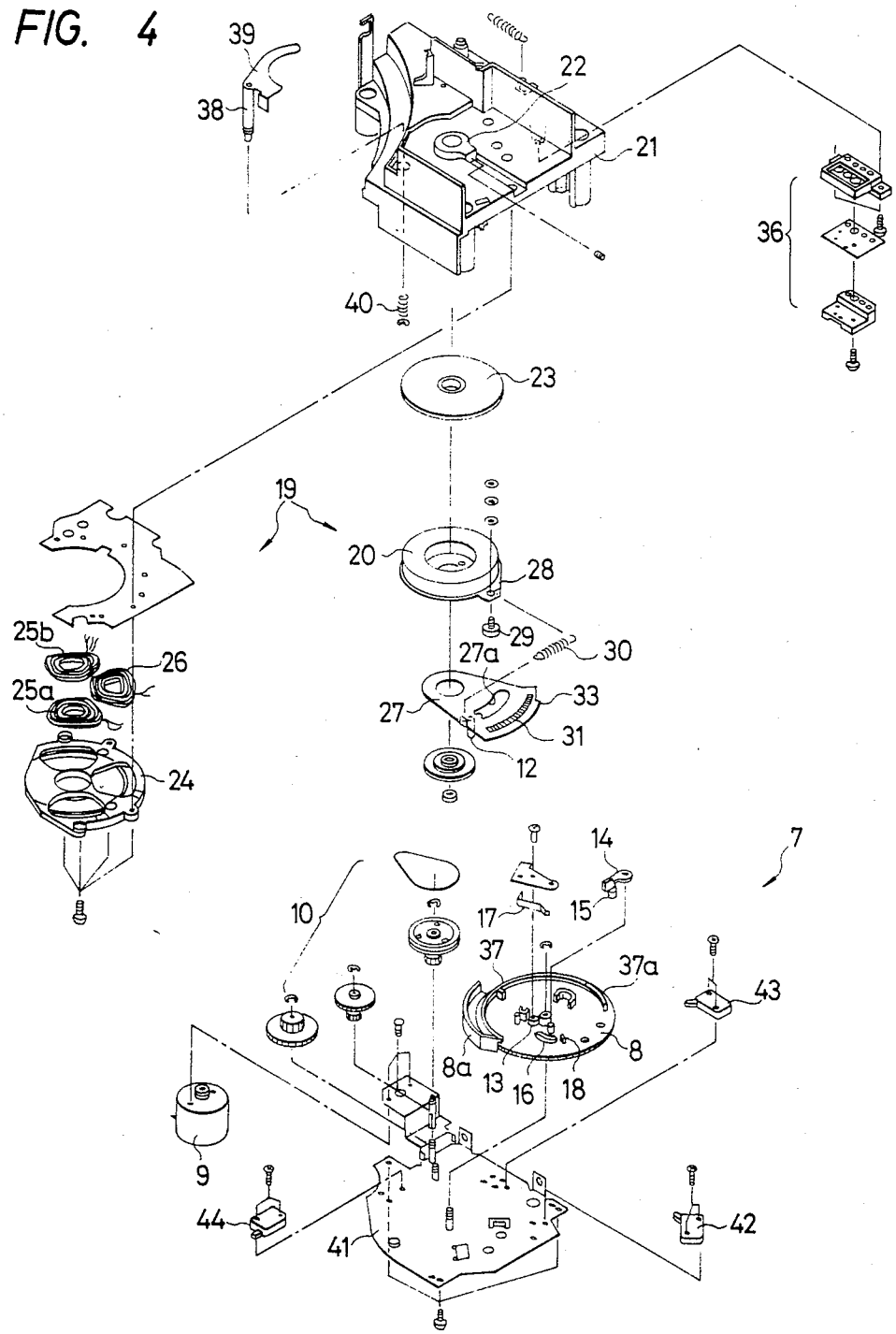
FIG. 4 is an exploded perspective view of the pickup arm drive mechanism of FIG. 3.

FIGS. 3 and 4 show, respectively, a top view and an exploded perspective view of the mechanical drive system 7 of the invention. As shown in FIGS. 3 and 4, the mechanical drive system 7 includes a rotor member 8 having gear teeth formed along its periphery. The rotor member 8 is arranged coaxially with the center or axis upon which the pickup arm 5 is mounted. A motor 9 provides drive power for moving the pickup arm. A power transmission 10, composed of a set of gears, transmits the drive power of the motor to the rotor member 8. A latch mechanism 11 is provided on the rotor member 8 for driving the pickup arm 5 from the arm rest position A to a position C close to the record's center. The latch mechanism 10 engages the pin member 12, thereby interlocking with the pickup arm 5 as the rotor member 8 rotates.

The latch mechanism 11 includes an oscillating arm 14 on which is supported a pin 13 fixed to the rotor member 8. A guide hole 16 is formed in the rotor member 8 to guide a guide pin 15 formed integrally with the oscillating arm 14. A spring 17 is engaged with the oscillating arm to pull the oscillating arm to an engagement position P where it is engagable with the pin member 12. The oscillating arm 14 is also movable to a non-engagement position against the pin 12 by cooperative operation with a clip member 98 provided on the rotor member 8. Driving of the pickup arm 5 is stopped by reversely moving the oscillating arm 14 to the nonengagement position. This occurs when the pickup arm 5 reaches the position C indicated in FIG. 3.

The DD drive system 19 includes a movable magnet attached to the pickup arm 5 and a fixed coil on the base 4. The DD drive system is used for moving the pickup arm 5 in an arc from an approximate center position D of a record to the position B, which is slightly outward from the outer edge of a normal 30 cm LP record.

A movable magnet 20 fixed to the rotary shaft (not shown) of the pickup arm 5 is supported for free rotation by a bearing 22 of an arm stand 21. The magnet 20 opposes a yoke 23 with a predetermined gap therebetween. The magnet 20 provides a magnetic field, which extends perpendicular to the plane of the magnet, with alternating poles.

A substrate 24 is attached to the arm stand 21 and located between the magnet 20 and yoke 23. A pair of drive coils 25a and 25b are provided for driving the pickup arm electromagnetically by cooperative operation with the magnet 20. A speed detection coil 26 detects the rate of movement of the pickup arm 5.

The drive coils 25a and 25b are configured at angles of approximately 180° around the center axis of the pickup arm 5. The speed detection coil 26 is positioned at an angle of 90° relative to the drive coils 25a and 25b. Drive current is provided to the drive coils 25a and 25b from a horizontal drive circuit, described below in detail, at the moment when the pickup arm 5 reaches the position D (FIG. 3). Changeover from the mechanical drive system 7 to the DD drive system 19 is carried out at the moment that the pickup arm 5 reaches the position C (FIG. 3). During the operation of the DD system, an output from the speed detection coil 26 is fed back to the horizontal drive circuit for providing speed control for the pickup arm 5.

The pickup plate 27 is provided under the magnet 20. The plate 27 turns together with the rotary shaft of the pickup arm 5. The plate 27 is attached to a magnet holder 28 and is positionally adjustable in a horizontal plane parallel to the plane of movement of the pickup arm 5 by means of an eccentric cam which engages the magnet holder 28 through an elongated hole 27a formed in the plate 27. A spring 30 is connected between the pickup plate 27 and the magnet holder 28. The pin member 12 discussed above is rigidly affixed to the pickup plate 27.

Figure 5:
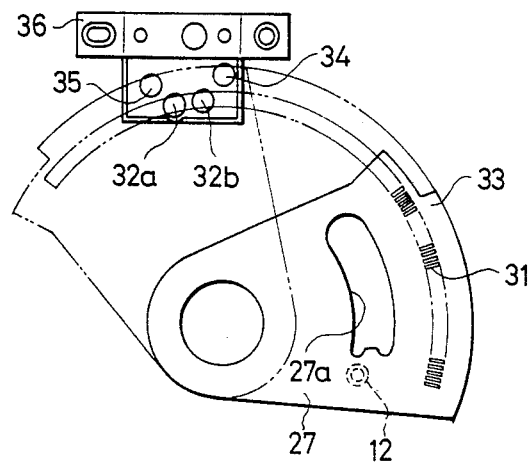
FIG. 5 is a top view showing a positional relationship between a pickup arm plate and an address sensor.

As shown in FIG. 5, the pickup plate 27 is provided with a perforated section 31 composed of a large number of parallel slits. These are used to correctly set the position of the pickup arm 5 in a manner to be described. An address A sensor 32a and an address B sensor 32b are positioned adjacent the perforated section 31 of the pickup plate 27 when the pickup arm 5 is in the turning range between positions D and B of FIG. 3.

The address A and B sensors 32a and 32b are used to monitor the position of the stylus of the pickup arm 5. The phase of the output of the address B sensor leads by 90° the output of the address A sensor. A DD area sensor 34 detects the DD range (positions D to B in FIG. 3) of the pickup arm 5. An end sensor 35 detects the end area. The sensors 32a and 32b, 34 and 35 are stationarily mounted on a holder plate 36. Changeover from the mechanical drive system 7, used during lead-in operations where the stylus is set in the record's lead-in groove, to the DD drive system is carried out in accordance with the output signal produced by the sensor 34. The output from the end area sensor 35, in cooperation with the outputs of the address A sensor 32a and the address B senspor 32b, enables the detection of the end of the playing of a record. Each of the sensors 32a, 32b, 34 and 35 is composed of a light transmitting element and a light receiving element arranged opposite one another through the pickup plate 27. The holder plate 36 which supports the sensors 32a, 32b, 34 and 35 is attached to the arm stand 21, as shown in FIG. 4.

With reference to FIGS. 3 and 4, a lifter cam 37 for the pickup arm 5 is provided on a rotor member 8 of the mechanical drive system. A pickup arm lifter shaft 38 is slidably mounted by an arm stand 21 so as to be freely movable up and down. The lower end of the shaft 38 rides on the top surface of the cam 37, while the other end of the shaft 38 is fixed to a lifter plate 38 which rests against the lower surface of the pickup arm 5 when the arm is being lifted. A spring 40 is provided around the shaft 38 which urges the shaft 38 downwardly against the cam 37.

Switches 42 and 43 are provided for detecting the fully raised and fully lowered positions, respectively, of the pickup arm 5, while a switch 44 is provided for detecting the arm rest position (position A shown in FIG. 3). The switches 42, 43 and 44 are mounted on a mechanical chassis 41 on which the mechanical drive system is also mounted. The switches 42, 43 and 44 are energized by a cam 8a provided on the circumference of the rotor member 38. The switch 44 which detects the completely raised position of the pickup arm also serves to detect the position of the pickup arm 5 immediately before it begins to be lowered onto a record in a lead-in operation. Specifically, and as will be described in further detail below, during a lead-in operation, the mechanical drive system 7 is held in a stand-by state immediately before the pickup arm 5 is lifted as instructed by the output from the switch 42. When a lower-arm command signal is activated when the pickup arm 5 reaches a desired intermusic position, the rotor member 8 of the mechanical drive system 7 is activated to lower the pickup arm 5.

Figure 6:
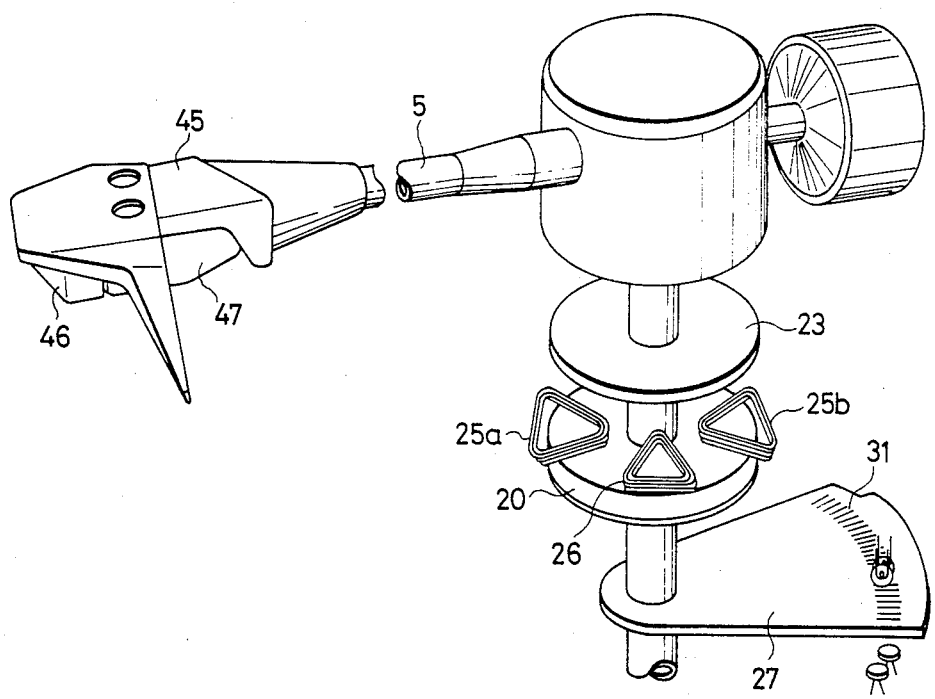
FIG. 6 is a perspective view showing a pickup arm base assembly.
Figure 7:
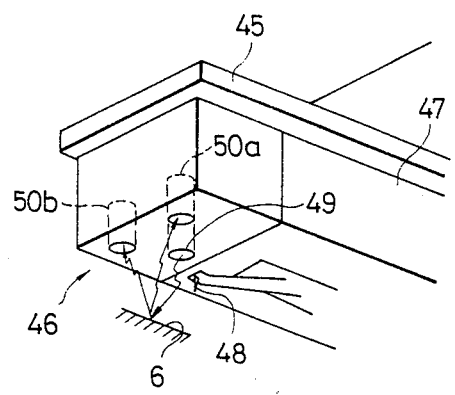
FIG. 7 is a perspective view showing a stylus assembly of the pickup arm.

FIG. 6 is a partially cut-away schematic view of the pickup arm assembly including portions of the DD drive system 19 and the pickup plate 27. A cartridge holder is attached to the outer end of the pickup arm 5. An intermusic sensor 46 is fixed to this cartridge holder. The intermusic sensor 46 is used for determining the position of the pickup arm 5 relative to intermusic portions on a record being played based on the difference in reflection ratios between the music-carrying portions of the record and the intermusic portions. As indicated in FIG. 7, the intermusic sensor 46 has a common light source, specifically, a light-emitting diode 49, located in a plane which passes through the longitudinal axis of the stylus 48 of the cartridge 47. Two light sensing elements 50a and 50b, specifically, phototransistors, are arranged on either side of the light-emitting diode 49. Preferably, they are located as close as possible to the light-emitting diode 49.

Figure 8:
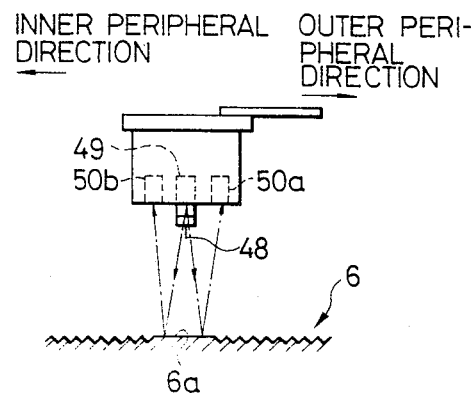
FIG. 8 shows positional relationships between an intermusic sensor and an intermusic portion on a record.
Figure 9:
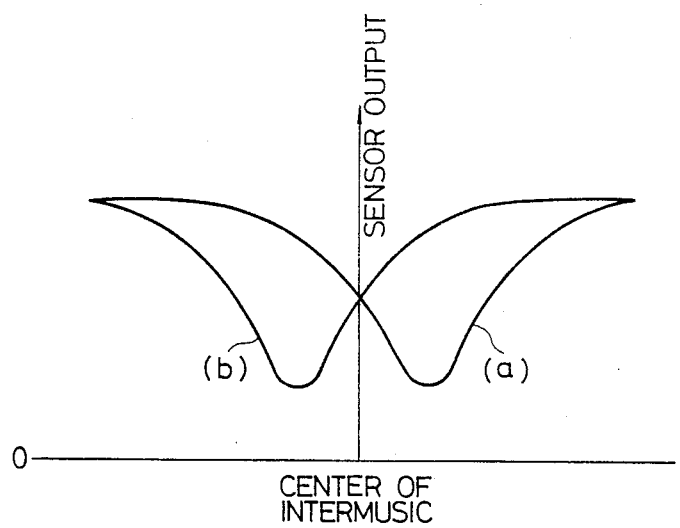
FIG. 9 is a graph showing output characteristics of the intermusic sensor of FIG. 8.

As shown in the diagram of FIG. 8, the light sensing element 50a on the side of the pickup arm 5 toward the center of the record in the playing position of the pickup arm 5 precedes the light sensing element 50b as the record is played. That is, the light sensing element 50a will first receive reflected light from an intermusic portion 6a on a record 6 as it is played. On the other hand, if the pickup arm 5 is moving toward the outer edge of the record, the light sensing element 50a will be the first to receive reflected light from an intermusic portion 6a. The resulting signals as the pickup arm 5 is moved back and forth across a record indicated by the graph of FIG. 9. In FIG. 9, (a) and (b) indicate the outputs of the light sensing elements 50a and 50b, respectively.

Figure 10:
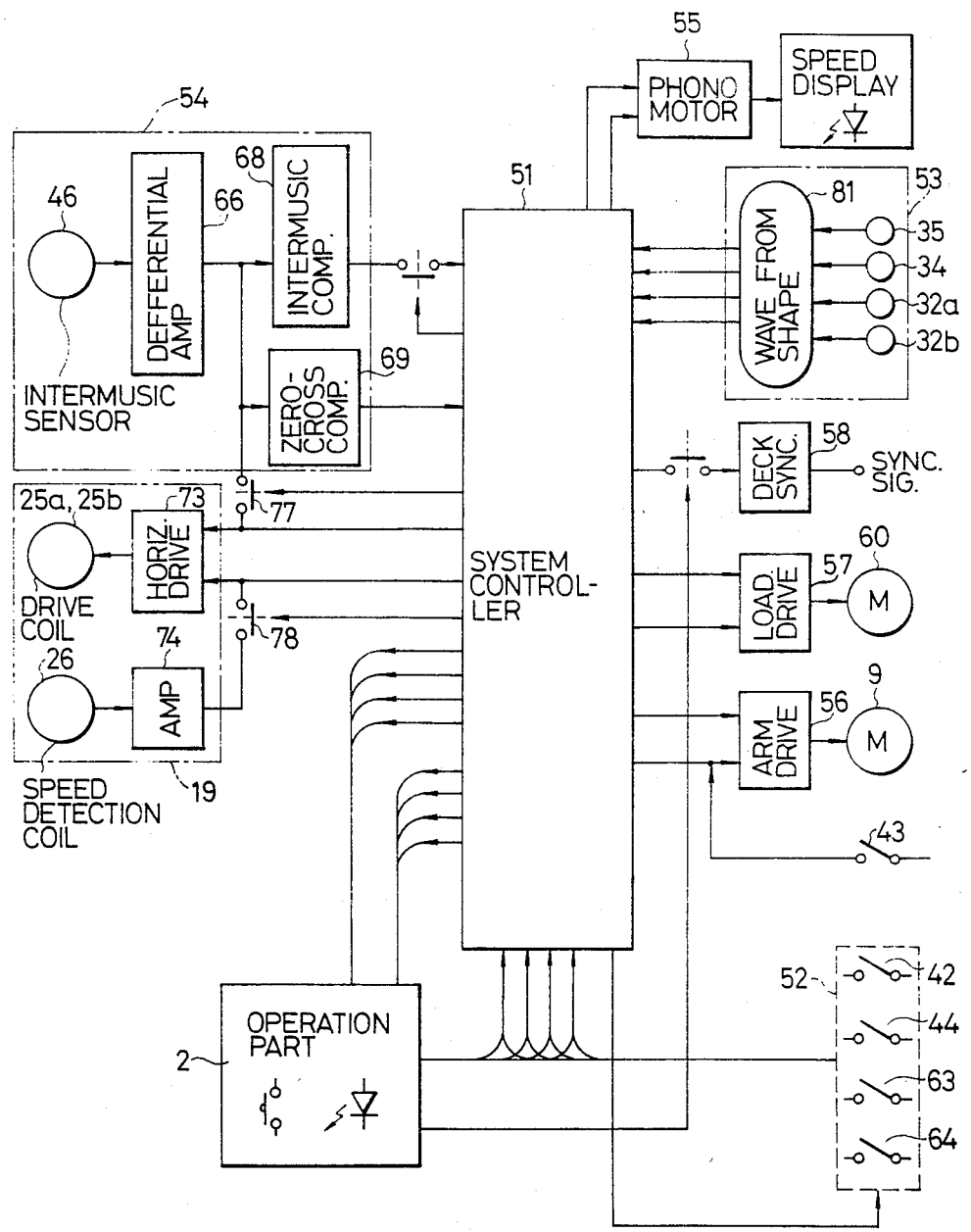
FIG. 10 is block schematic diagram showing an example of a control circuit employed with the pickup arm drive mechanism of the invention.
Figure 11:
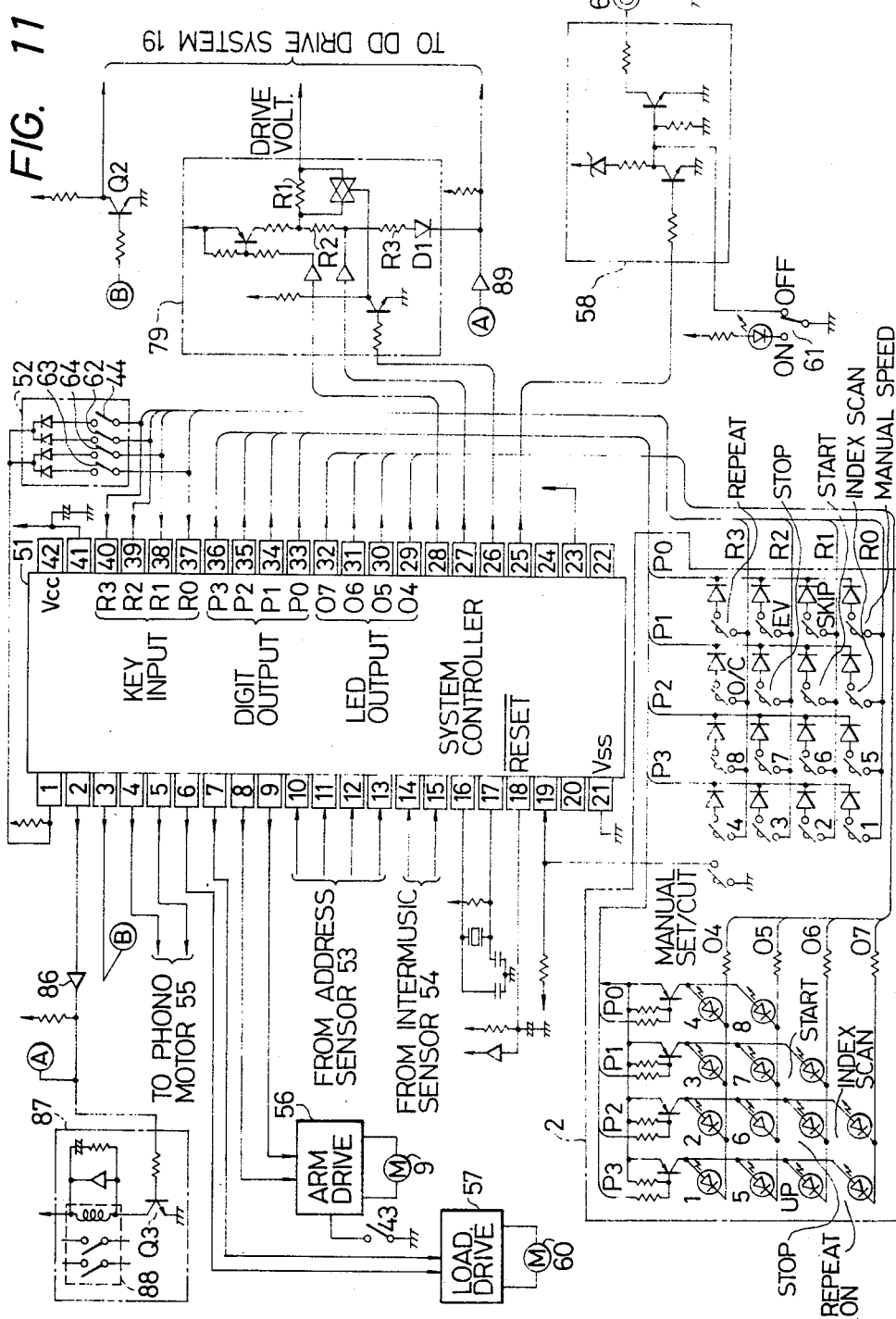
FIG. 11 is a circuit diagram showing a portion of the controller of FIG. 10.

FIG. 10 is a block diagram of a specific example of a control system of the invention, and FIG. 11 is a more detailed schematic diagram thereof. In FIGS. 10 and 11, reference numeral 51 indicates a system controller which may be implemented, for example, with a four-bit microprocessor. The system controller 51 is used to control all the other blocks shown in the diagram. Various control signals such as a command signal from an operations circuit 2, a system performance state signal from a switch circuit 52, an address signal from an address circuit 53, and intermusic signal from an intermusic sensor circuit 54, etc. are applied to corresponding inputs of the system controller 51. In response to these signals, the system controller 51 generates control signals which are applied to control the DD drive system 19 and a deck synchro circuit 58.

Further, all operational keys used for programming song selection, command keys for instructing various operations, and light-emitting diodes for indicating activated operations are included in the operations circuit 2 and physically mounted on the control panel of the record player. An arm drive circuit 56 is used to interface the arm drive motor of the mechanical drive system to respond to control signals produced by the system controller 51 and is also used to output signals from the detecting switch 43. A loading drive circuit 57 is provided as an interface for driving a motor 60 which controls the forward and reverse motion of the slide base 4 (FIG. 1), also in response to control signals produced by the system controller 51.

The deck synchro circuit 58 is used for interfacing the record player with a selectively connected tape deck (not shown). The circuit 58 is activated when a synchro switch 61 is in the ON position. As used herein, a "deck synchro" operation refers to a series of operations in which the tape deck is kept in synchronization with the playing of records. More specifically, the tape deck is set in a recording pause condition when the synchro output terminal 62 carries an active signal, set in the recording condition when the synchro switch 61 is turned ON and while a record is being played, and also set in the pause condition when the pickup arm 5 is being raised or lowered. The tape deck repeats a cyclic operation of pause-recording-pause for each pulse present on the pause terminal.

The switch circuit 52 includes switches 63 and 64 which detect the open and closed positions of the player body. The switch circuit 52 also includes the above-mentioned switches 42 and 44 which detect the raised and rest positions, respectively, of the pickup arm 5.

Referring to the circuit diagram of FIG. 12, the intermusic sensor 46 includes a single light-emitting diode 49 and two light sensing elements 50a and 50b, as described in conjunction with FIG. 7. The light sensing elements 50a and 50b receive light reflected from intermusic portions 6a of a record 6 being played. Output signals are produced by the light sensing elements 50a and 50b with a magnitude corresponding to the received light intensity. Outputs from the two light sensing elements 50a and 50b are applied to a differential amplifier circuit 66 after they have been boosted by an amplifier circuit 66 composed of operational amplifiers $OP_1$ and $OP_2$. The output of the operational amplifier $OP_2$ is also AC coupled to the inverting input of an AC amplifier circuit 67.

The outputs from the operational amplifiers $OP_1$ and $OP_2$ are shown by the waveform of FIG. 13A for the case of the pickup arm 5 being moved across a record. In FIG. 13A, A represents an intermusic interval, B represents a lead-in groove, and C an exit or lead-out groove. The differential amplifier circuit 66, to the inverting and noninverting inputs of which are applied the output signals from the operational amplifiers $OP_1$ and $OP_2$, respectively, has an output waveform as shown by FIG. 13B. As clearly seen from FIG. 13B, the differential output signal for the intermusic interval has approximately an "S" shape. The differential signal is fed to the noninverting input of an operational amplifier $OP_4$, which constitutes an intermusic comparator 68. Also, the differential signal is fed to the noninverting input terminal of an operational amplifier OP$_5$, which constitutes a zero-crossing comparator 69. A reference level V$_{TH}$ is applied to the inverting input terminals of the operational amplifier OP$_4$. This reference level V$_{TH}$ is made to vary depending on the setting of a sensitivity selection switch 70 and also in accordance with the up and down movement of the pickup arm 5. The provision of the sensitivity setting switch 70 provides for accurate determination of the position of intermusic and music portions on a record even though the sensitivity of the light sensing elements or the output of the light-emitting diode may vary. As to the variation of the level V$_{TH}$ with the vertical position of the pickup arm 5, a semiconductor switch 71 varies the reference level V$_{TH}$ in accordance with the vertical position of the pickup arm 5. An output from the operational amplifier OP$_4$ is inputted as an intermusic signal to the system controller 51 (terminal 15 shown in FIG. 11).

The AC amplifier circuit 67 receives one of the two sensor outputs of the amplifier circuit 65 through a capacitor C$_0$ interposed between the output of the operational amplifier OP$_2$ and inverting input of the operational amplifier OP$_6$ with the capacitor blocking the DC components contained therein. After the DC component is amplified by the operational amplifier OP$_6$, the sensor output signal received from the operational amplifier OP$_2$ is applied to the noninverting input of the operational amplifier OP$_7$, the latter constituting a search comparator 90.

In a zero-crossing comparator 69, the operational amplifier OP$_5$, having a fixed reference voltage B$_2$ applied to its inverting input, detects the zero-crossing point of the amplified differential signal and outputs the zero-crossing signal. The search comparator 90, to which the reference level V$_{TH}$ is applied on the inverting input terminal, receives a signal from the AC amplifier circuit 67 and outputs an intermusic indicating signal as a result. The zero-crossing signal and the intermusic indicating signal are inputted to a gate circuit 72 and thence to the system controller 51 (terminal 14 in FIG. 11). In the system controller 51, the center of each intermusic interval is detected based upon the zero-crossing signal and the intermusic indicating signal during the playing of a record. ON-OFF operation of the semiconductor switch 71 is effected in accordance with a mute signal applied to the gate circuit 72 and furnished by the system controller 51.

Figure 14:
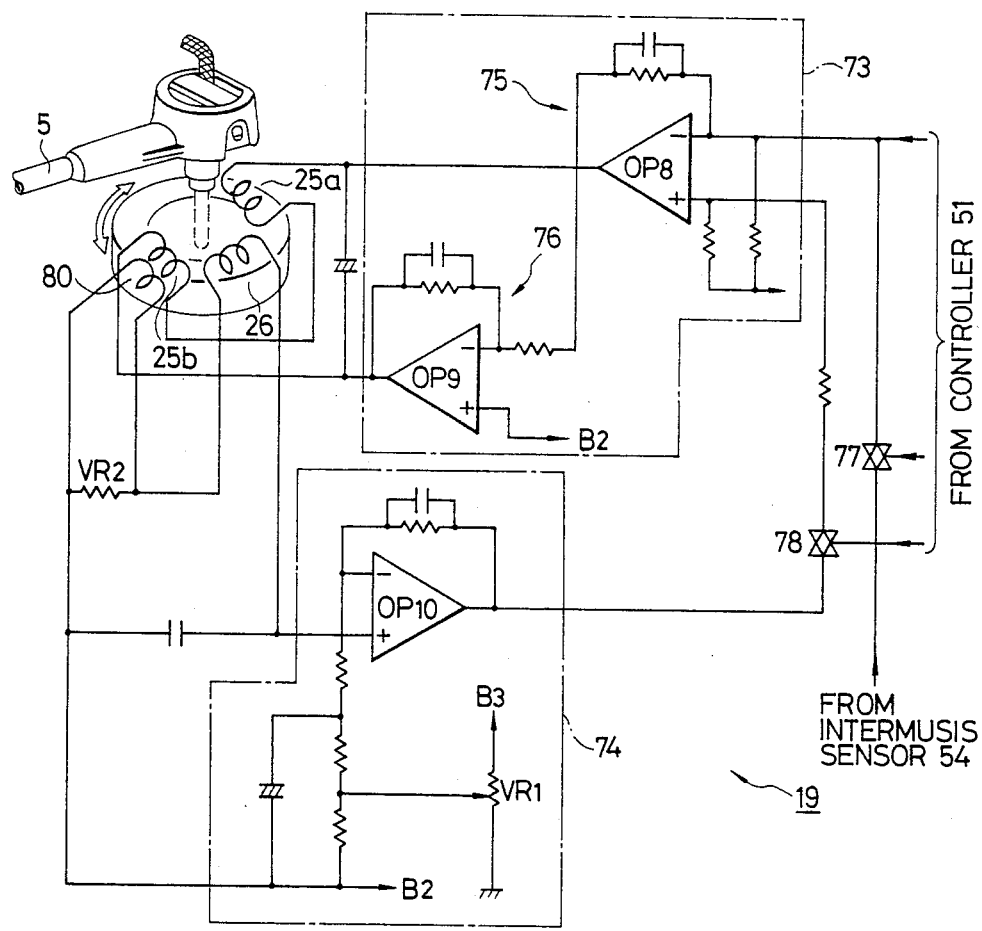
FIG. 14 is a detailed circuit diagram of a drive circuit for moving the pickup arm assembly.
Figure 15:
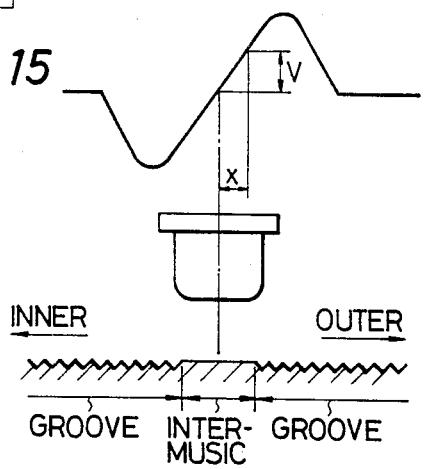
FIG. 15 is a diagram showing the relationship between a servo signal and an intermusic portion.

FIG. 14 is a circuit diagram showing a specific example of the DD drive system 19. The DD drive system includes series-connected drive coils 25$a$ and 25$b$, a horizontal drive circuit for supplying a drive current to these coils, the speed detection coil 26, and an amplifier circuit 74 which amplifies the voltages detected by the speed detection coil 26.

The horizontal drive circuit 73 includes a differential amplifier 75 composed of an operational amplifier OP$_8$ and a unity gain inverter 76, the latter being implemented with an operational amplifier OP$_9$. The horizontal drive circuit 73 is used for driving the pickup arm 5 while simultaneously controlling its speed. This is effected by adding, in a manner to be described in detail below, a band servo signal from the intermusic sensor circuit 54 to the inverting input terminal of the operational amplifier OP$_8$ and applying a speed servo signal from the speed detection coil 26 to the inverting terminal of the operational amplifier OP$_8$ after suitable amplification. Current is applied to the drive coils 25$a$ and 25$b$ from the output of the operational amplifier OP$_8$ in proportion to the difference between the signals applied to the inverting and noninverting input terminals of the operational amplifier OP$_8$.

The band servo signal and the speed servo signal are selectively applied to the differential amplifier 75 via switches 77 and 78. The switches 77 and 78 conduct ON and OFF operations in accordance with control signals transmitted from the system controller 51.

The amplifier circuit 74, implemented with an operational amplifier OP$_{10}$, amplifies the output signal from the speed detection coil 26. The output signal 50 thus produced represents the rotary speed of the pickup arm 5. This output signal is a speed servo signal which is applied to the horizontal drive circuit 73. In the amplifier circuit 74, VR$_1$ is a variable resistor used for offset adjustment.

The band servo operation will now be described. A differential output signal from the differential amplifier circuit 66 in the intermusic sensor circuit 54 has an S-curve characteristic for intermusic intervals, as shown in FIG. 5 and as was described with reference to FIG. 13B. This differential signal is used as the band servo signal. When the stylus 48 of the pickup cartridge is moved into an intermusic interval, the band servo signal is activated. In response to activation of this signal, current is fed to the drive coils 25$a$ and 25$b$ from the horizontal drive circuits 73, and subsequently the pickup arm 5 is moved towards the inside of the record until it reaches the center of the intermusic interval. Such a control operation for locating the stylus 48 at the center of intermusic intervals is called a "band servo" operation. The band servo operation is started when the pickup arm 5 reaches an intermusic interval during times of programmed playing. The operation ends upon the stylus 48 reaching the surface of the record being played.

In the case where the pickup arm 5 is operated with the system controller 51 based upon a start instruction, a stop instruction and a program play instruction supplied from the operational circuit 2, the drive voltage produced from the voltage generating circuit 79 (FIG. 11) is applied to the inverting input terminal of the operational amplifier OP$_8$. The speed of movement and the direction of the pickup arm 5 are controlled by changing the value and the polarity of the driving voltage relative to the reference voltage. This is done based upon control signals outputted from terminals 26, 27 and 28 of the system controller 51 indicative of high speed motion, motion towards the inside of the record, and motion towards the outside of the record, respectively.

With reference again to FIG. 14, the drive coil 25$b$ includes a cancellation coil 80 formed as an integral part thereof. The coil 80 is series-connected with the speed detection coil 26. The cancellation coil 80 is used to increase the output signal-to-noise ratio from the speed detection coil 26 for providing a more stable speed servo operation by cancelling noise components produced in the drive coils 25$a$ and 25$b$. More specifically, when current flows through the drive coils 25$a$ and 25$b$ to drive the pickup arm 5, this current causes the generation of a magnetic flux, and consequently an alternating current flows through the speed detection coil 26, thereby giving rise to a noise component. However, this component, which is an AC component, can be cancelled by the provision of the cancellation coil 80 in series with the speed detection coil 26. The cancellation coil 80 is provided with a variable resistor VR$_2$ series-connected therewith with which the cancellation ratio can be variably set.

Figure 16:
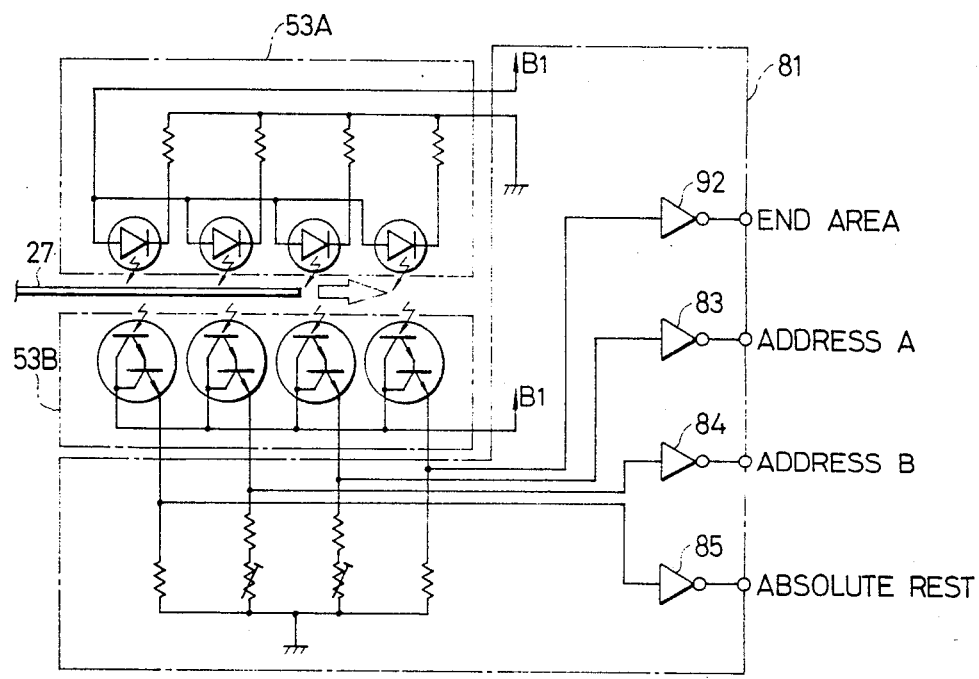
FIG. 16 is a circuit diagram of an address sensor used with the invention.
Figure 17:
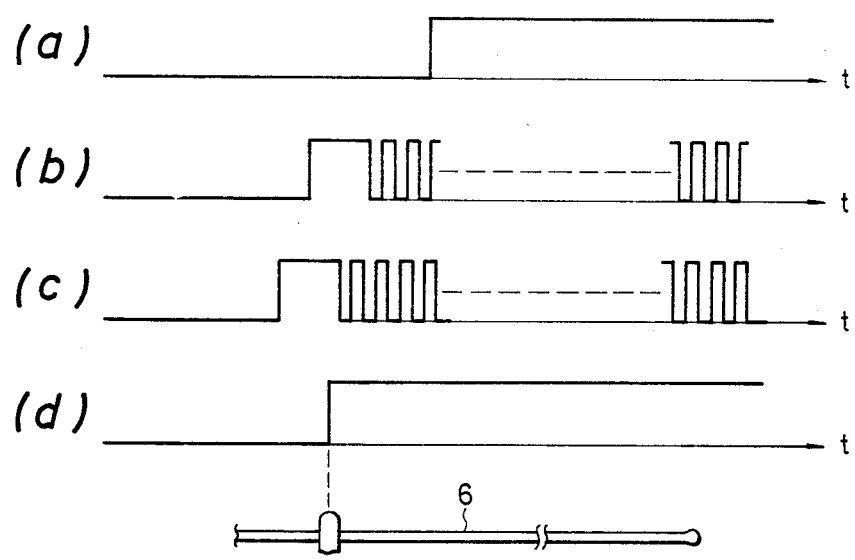
FIGS. 17A–17D, taken together, are a timing chart showing outputs from each of a plurality of sensors in the circuit of FIG. 16.

With reference to FIG. 16, the address A sensor 32a and address B sensor 32b, the DD area sensor 34 and the end area sensor 35 are composed of a light-transmitting section 53a including four light-emitting diodes, and a light sensing section 53b including four phototransistors arranged opposite corresponding ones of the light-emitting diodes. The pickup plate 27, which is connected to move rigidly with the pickup arm 5, moves between the light-transmitting section 53a and the light-sensing section 53b. Each output produced by one of the phototransistors of the light sensing section 53b is subjected to waveform shaping by a corresponding one of inverters 82–85 which constitute a waveforming circuit 81. The output of the waveform shaping circuit 81 during the time of a lead-in operation of the pickup arm 5 is as shown in FIGS. 17A–17D. The end area signal of FIG. 17A is applied to the terminal 10 of the system controller 51, the address A signal (FIG. 17B) is applied to the terminal 12, the address B signal (FIG. 17C) to the terminal 13, and the DD area signal (FIG. 17D) to the terminal 11.

Figure 18A:
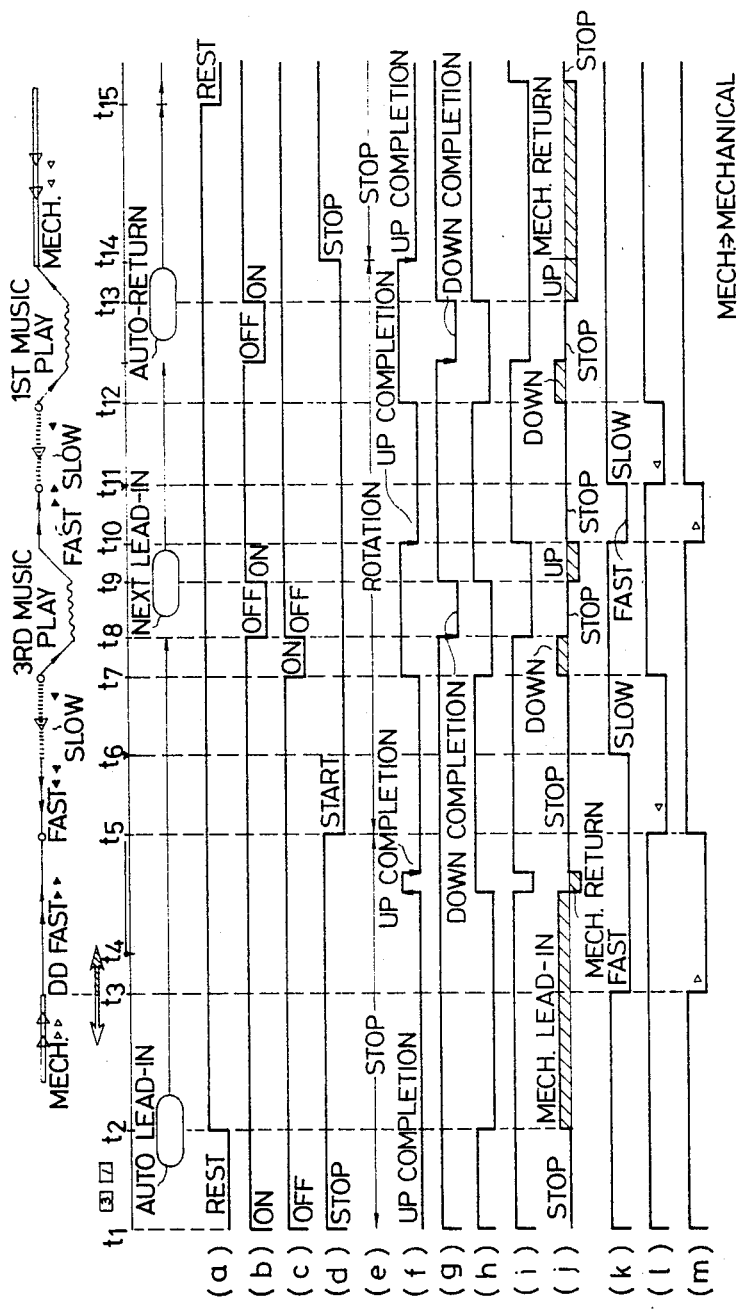
FIGS. 18A and 18B are timing charts used in a description of the invention.

Next, the sequential operation of the pickup arm controller of the invention will now be described. First, a description will be given with reference to FIGS. 18A and 18B related to the operation of programmed playing in which a third song on a standard 30 cm LP record disc has been chosen, and thereafter the first song on the disc is to be played. This description assumes that the record has already been set in place, the player body is closed, and the pickup arm 5 is in the rest position.

When this program is selected, the light-emitting diode 3 (u) is activated to show that the third song on the record has been selected upon depression of the selection key "3" of the operational circuit 2 after the power switch has been turned ON at time $t_1$. Next, after the selection key "1" has been activated, the light-emitting diode 1 (v) is correspondingly lit. In the event that an error has occurred during programming, the error may be cleared by turning ON the STOP key to reset the program. After the program has been set, the terminal 8 (h) of the system control 51 is set to the L (low) logic level and the motor 9 (j) of the mechanical drive system 7 starts to rotate in the direction which causes the pickup arm 5 to move in the lead-in direction upon depression of the START key at time $t_2$. At this time, the light-emitting diode START (w) is activated to show the start of the lead-in operation, and simultaneously the rest position detection switch 44 (a) is reversed in position. The pickup arm 5 continues the lead-in operation until, at time $t_3$, the stylus 48 reaches a point near the center spindle of the record. At that time, the output (o) from the DD area sensor 34 goes to the H (high) logic level. In response to this signal on its terminal 11, the system controller 51 sets the terminals 26 (k) and 28 (m) to the L level to thereby actuate the DD drive system 19. After activating the DD drive system in the DD drive range, the latching of the mechanical drive system is released to complete the changeover from the operation of the mechanical drive system 7 to DD drive system 19.

After the latching of the mechanical drive system has been released, the mechanical drive system 7 nevertheless continues to operate in the lead-in direction. During this time, the cam portion 8a of the rotor member 8 turns off the switch 42, and simultaneously the output (f) from the switch 42 is inputted, as an H level signal, to the terminal 39 of the system controller 51. In response to the signal, the terminal 8 (h) of the controller 51 is set to the H level, while the terminal 9 (j) is set to the L level, thereby causing the motor 9 (j) to rotate reversely, that is, in the direction which moves the pickup arm 5 towards the outside of the record. When the switch 42 is again activated, the terminals 8 (h) and 9 (j) are set to the H level to thereby stop the motor and to set the switch 42 in its standby or ON condition.

Figure 19:
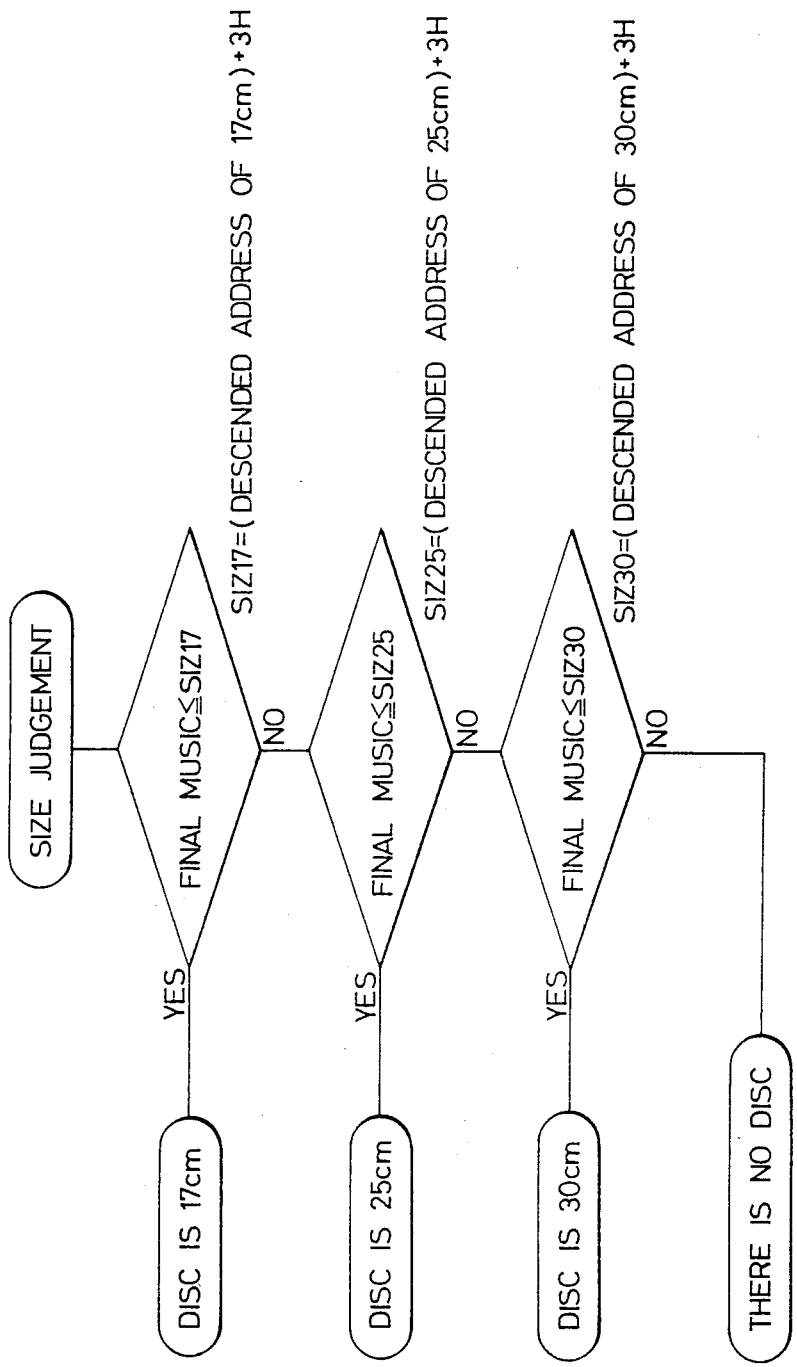
FIG. 19 is a flow chart related to record size evaluation.

During the continued lead-in operation (at high speed) of the DD drive system, the system controller 51 counts the address pulses inputted thereto from the address A sensor 32a (p) and the B sensor 32b (q) on input terminals 12 and 13, respectively. The counting of these pulses commences at time $t_3$. The search for the selected intermusic interval is commenced at time $t_4$ where, as an example, the specified count or address is reached. In response to the intermusic indicating signal (r) inputted to the terminal 14 from the intermusic sensor circuit 54 at the time of search, intermusic intervals starting from the lead-in groove are counted. A final decision as to the size of the record is made at time $t_5$ when the pickup arm 5 reaches the search end address from the outer edge of the record. The decision as to the record size is made by sequential comparison of the value of the address count corresponding to addresses stored for predetermined record sizes, for instance, 17 cm, 25 cm and 30 cm. This operation is shown in detail in the flow chart of FIG. 19. As shown in FIG. 3, the determination of the size is made by comparing the currently registered count or address +3 with the stored record size values.

After the completion of the evaluation of the record size, the terminal 27 (i) of the system controller 51 is set to the L level and the terminal 28 (m) to the H level while the terminal 26 is held at the L level to thereby reverse the DD drive system. Subsequently, the pickup arm moves at a high speed to the first programmed song or selection. That is, the pickup arm 5 moves first to the third song on the record. Simultaneously, that is, at time $t_5$, the terminal 4 (d) is set to the L level, thereby starting the motor 55 which rotates the turntable. Also, the light-emitting diode 3 (u) is flashed from the time $t_5$ until the end of the playing of the third song on the record.

Figure 20:
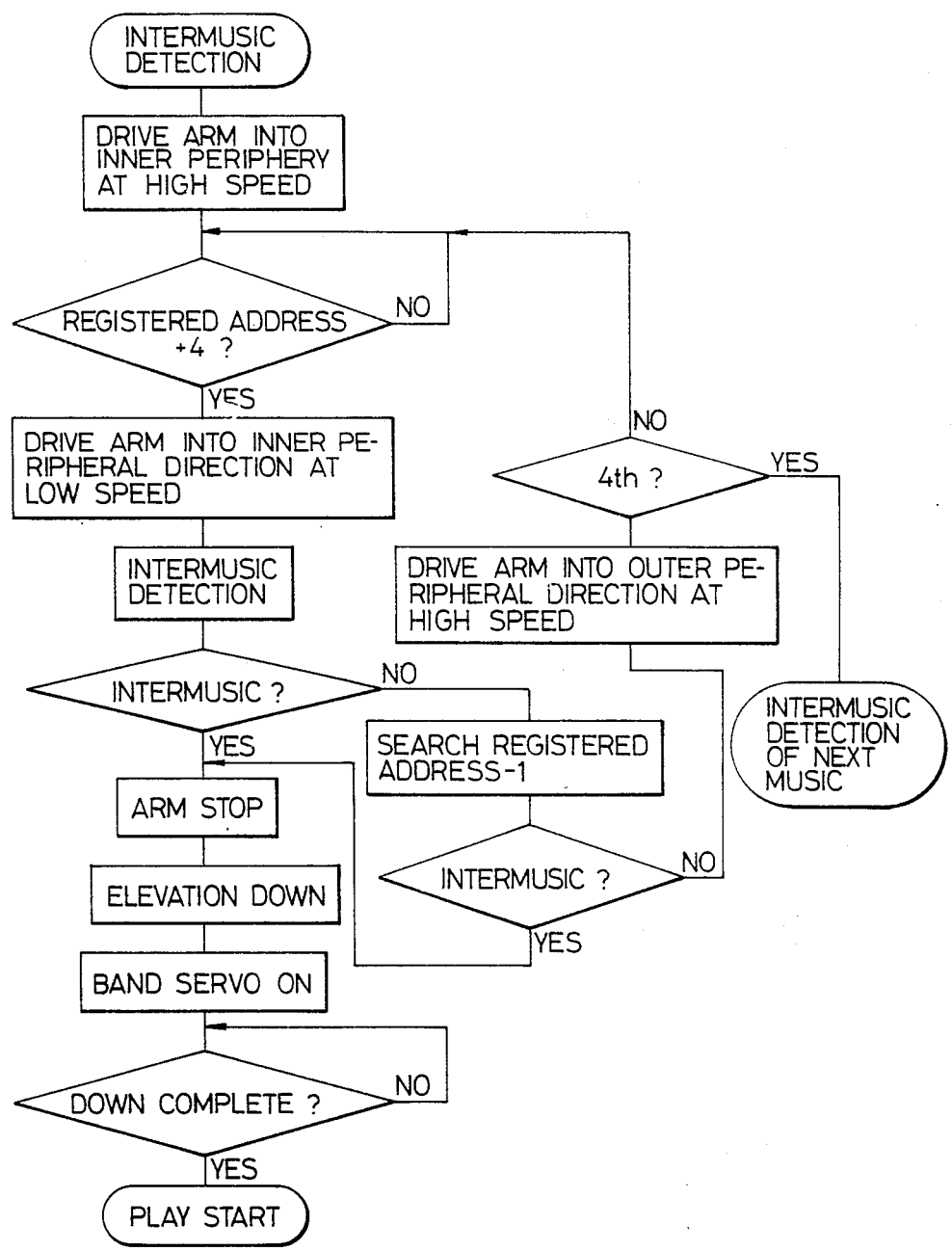
FIG. 20 is a flow chart describing an intermusic detecting operation.

The intermusic detecting operation will now be described with reference to the flow chart of FIG. 20. At the time $t_6$ that the stylus 48 of pickup arm 5 is travelling at high speed in the direction of the inside of the record, four addresses, for instance, before the registered address for the third song (the position of the registered address +4), the terminal 26 (k) is set to the H level thereby changing the arm speed from high speed to low speed.

During the subsequent low speed travel, intermusic detection is effected to search for the third song on the record. At the moment when the intermusic signal from the intermusic sensor circuit 54 corresponding to the third song is inputted to the terminal 15, the system controller 51, at the rising edge (time $t_7$) of this signal, sets the terminal 27 (i) to the H level to stop the DD drive system. Simultaneously, the light-emitting diode START (w) and the light-emitting diode UP (y) are extinguished. At the same time, the terminal 8 (h) is set to the L level, thereby starting the motor 9 (j) of the mechanical drive system 7 and thereby putting the mechanical drive system 7 in the proper condition for performing the arm lowering operation. Also at this time, the terminal 3 (c) is also set to the L level. Further, the switch 77 (FIG. 11) is closed, thereby activating the band servo signal by setting the collector of a transistor Q2 (FIG. 11) in the appropriate state. Consequently, the pickup arm 5 is driven in the horizontal plane by the DD drive system in accordance with the band servo operation, thereby causing the stylus 48 of the pickup arm 5 to be located at the center of the intermusic interval preceding the desired song. Even if there is some eccentricity on the record, the correct operation will still be carried out.

When the cam portion 8a (FIG. 3) of the rotor member 8 turns on the switch 43 at time $t_8$, the output (g) of the switch is set to the L level, thereby setting the terminal 9 (i) to the L level. This causes the motor 9 (j) of the mechanical drive system to stop and the third song to be played. Simultaneously, the terminal (c) is set to the H level and the transistor Q2 is turned ON, thereby opening the switch 77 and halting the band servo operation.

Furthermore, the mute signal (b) outputted from the terminal 2 is cancelled (set to the L level), and the output from the buffer 86 also set to the L state, thereby turning off the transistor Q3 of the muting circuit 87. In this situation, the muting relay 88 is turned off, setting the system to the play condition, that is, allowing the audio output from the cartridge to be amplified. When the mute signal (b) goes to the L level, the transistor Q4 of the intermusic sensor 54 (FIG. 12) is turned OFF, closing the switch 7.

The sensitivity of the intermusic sensor circuit 54 is changed to "low" by changing the reference level $V_{TH}$ used for the operational amplifiers $OP_4$ and $OP_7$. Furthermore, when the mute signal (d) goes to the L level, the output from the buffer 89 is set to the L level, thereby opening the switch 78 (FIGS. 10 and 14) and consequently transmitting the speed servo signal from the speed detection coil 26 and the DD drive system 19 to the horizontal drive circuit 73 and hence shutting off the speed servo operation. Simultaneously, when the output of the buffer 89 goes to the L level, the voltages at the inverting and noninverting input terminals of the differential amplifier 75 (FIG. 14) of the DD drive system 19 are slightly unbalanced. This provides for an anti-skating operation during playing.

If the intermusic detection operation fails, for instance, by the desired song being passed, the pickup arm 5 will be made to travel at high speed toward the outer periphery of the record. When it reaches an address of the currently registered address +4, the direction of movement of the pickup arm 5 will be reversed. Thereafter, the pickup arm 5 will be made to move at low speed toward the inside of the record, thereby repeating the intermusic detecting operation in the manner described above. If the desired intermusic interval is not been detected after a specific number of such repetitions, for instance, four repetitions, the music selecting operation for the next programmed song is commenced. A search for the third song is then again effected following the playing of the previously selected song. For instance, two addresses before the registered address for the fourth song, the system controller 51 is put in an "input wait" condition waiting for the zero-crossing signal (r) and the intermusic signal (s) to be applied in their active states to the input terminals 14 and 15. When an H level zero-crossing signal is present on terminal 14 and a pulse of the intermusic signal is applied to the terminal 15, the system controller 51 detects the arrival time $t_9$ of the stylus at the intermusic interval between the third and fourth songs at a time corresponding to the rising of the zero-crossing signal. At time $t_9$ when the end of the third song is detected, an H level mute signal (b) is outputted from the terminal 2 to turn ON the transistor Q3. Thereby, the muting relay 88 is turned ON, shutting off the audio signal circuit. Simultaneously, the sensitivity of the intermusic sensor circuit 54 is changed to "high" and the speed servo of the DD drive system is turned ON. At this time, the light-emitting diode UP (v) is illuminated and the light-emitting diode "1" (v) is made to flash until the end of the playing of the first song.

Further, the terminal 8 (h) is set to the H level, thus causing the motor 9 (j) of the mechanical drive systems 7 to rotate and cause the raising of the pickup arm 5. At this time, the rotor member 8 turns, thereby turning off the detection switch 43 (g).

At the time $t_{10}$ when the switch 42 is turned ON, the terminal 9 is set to the H level, and thereafter the motor 9 (j) is stopped. Simultaneously with the end of the pickup arm raising operation, the terminals 26 and 28 are set to the L level, and the mechanical drive system 7 starts, hence causing the pickup arm 5 to travel at high speed to the first song at the outer peripheral of the record. At the time $t_{11}$ that the pickup arm 5 passes through the first intermusic interval and reaches a position four addresses before the first song, the terminal 26 of the system controller 51 is set to the H level, terminal 27 to the L level and terminal 28 to the H level. Consequently, the DD drive system 19 is reversed in direction, causing the pickup arm 5 to travel at low speed to the first song.

From the time $t_{12}$ that the pickup arm 5 reaches the set address for the first song, the playing of the first song is commenced through a process identical to that described with regard to the playing of the third song. However, in this case, the pickup arm 5 is lowered without the use of a band servo operation.

Similar to the operation for playing the third song, the end of the first song is detected at time $t_{13}$. Thereafter, the lifting of the tone arm is effected. When the program has been completed, the terminal 18 of the system controller 51 is maintained at the H level and the terminal 9 at the L level. From the time $t_{14}$ when the detection switch 42 is turned on, the mechanical drive system 7 continues to rotate in the lead-out direction to cause the pickup arm 5 to travel at high speed to its rest position. At time $t_{14}$, the turntable is stopped. At the time $t_{15}$ when the pickup arm 5 reaches the rest position and the rest position detection switch 44 is turned ON, the terminal 9 of the system controller 51 is set to the H level, thereby stopping the motor 9 of the mechanical drive system 7, and simultaneously putting the pickup arm 5 in its standby condition. At that point, the programmed playing operation is terminated.

Figure 21A:
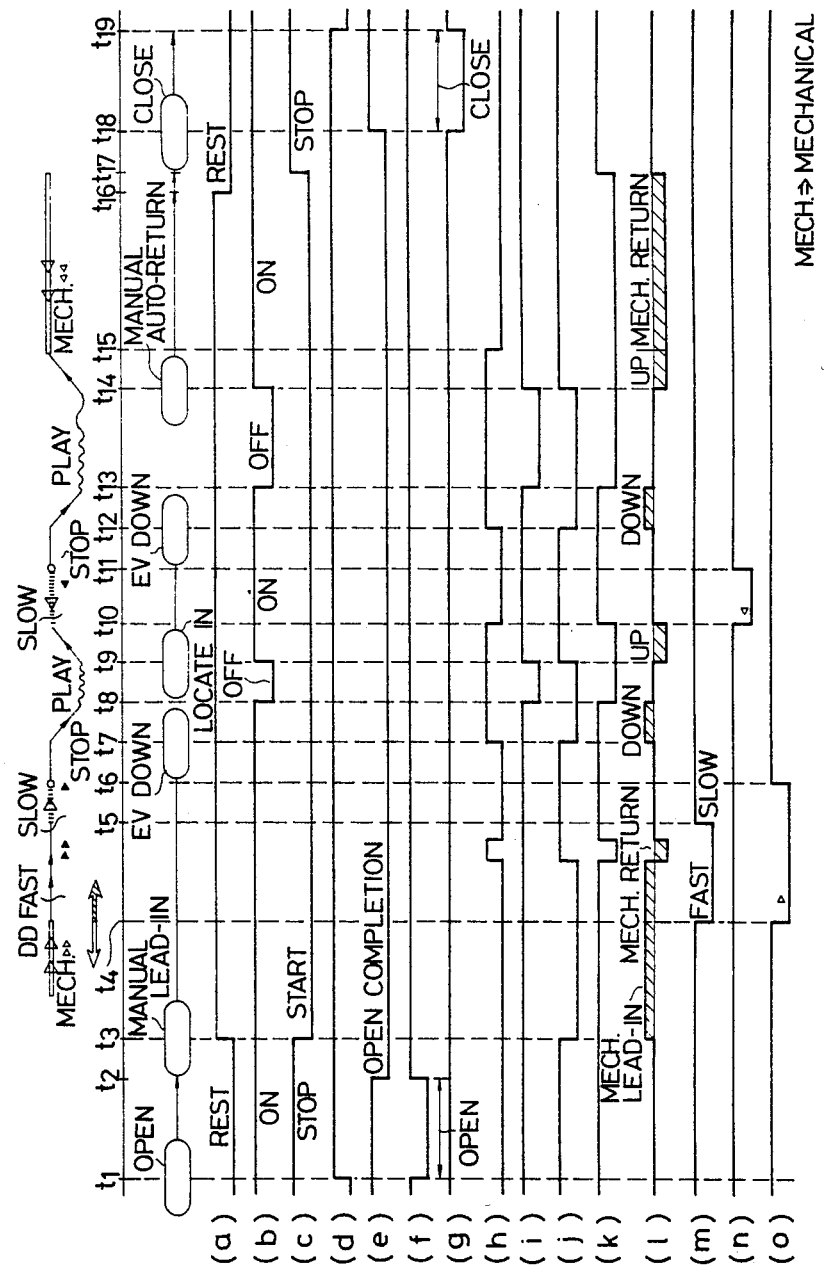
FIGS. 21A and 21B are timing charts for describing operations in a manual playing mode.
Figure 21B:
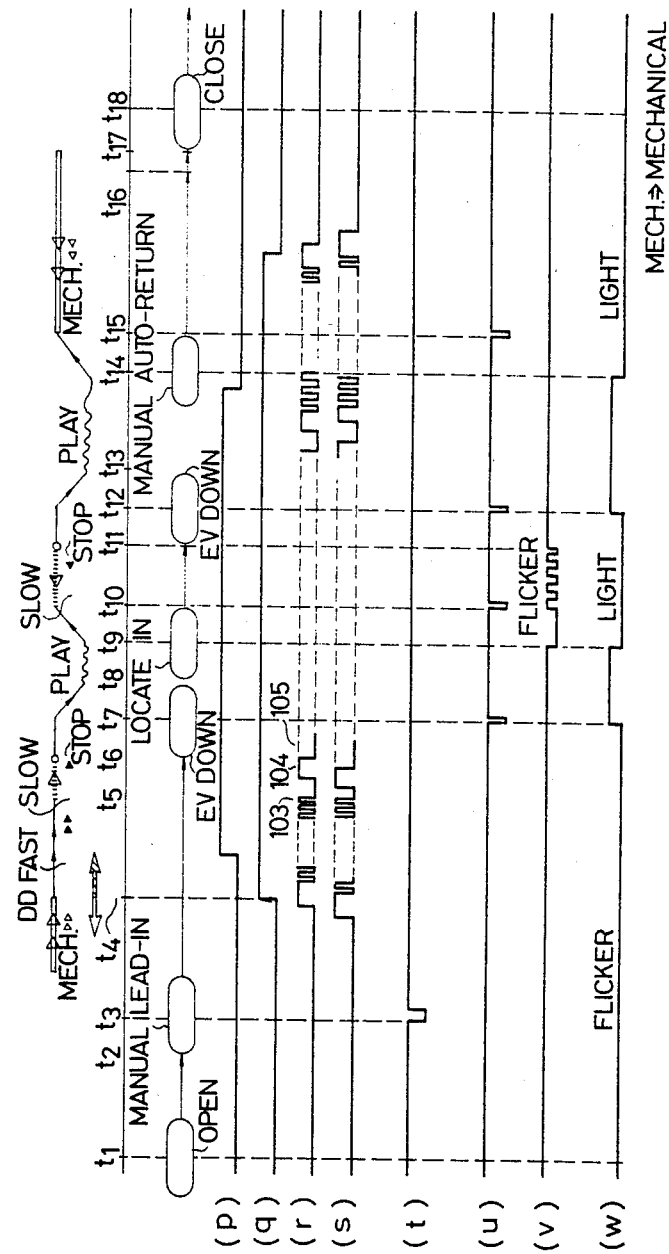

The playing operation for the manual mode will now be described with reference to the timing charts of FIGS. 21A and 21B. Turning ON the OPEN/CLOSE key at time $t_1$ causes the terminal 6 of the system controller 51 to be set to L level. Then, the motor 60 starts to turn in the direction which causes the opening of the player case. The slide base 4 is then caused to extend forwardly to the position illustrated in FIG. 1B. At the moment that the open position switch 64 (e) is turned ON by the slide base 4 at the time $t_2$, the terminal 6 of the system controller 51 is set to the H level, thereby causing the motor 60 to stop. If the switch 64 fails to be turned ON after a specified period of time, for instance, 25 seconds from time $t_1$, the system controller 51 makes the motor stop anyway.

By turning ON the ARM MANUAL SET key at time $t_3$ after a record has been loaded onto the turntable 3, the terminal 19 of the system controller 51 is set to the L level, and in response to this, the terminal 8 (j) is set to the L level, thereby causing the motor of the mechanical drive system 7 to start for the lead-in operation of the pickup arm 5. At this time, the terminal 4 (c) of the system controller 51 is set to the L level, thereby causing the motor 55 to rotate.

Thereafter the pickup arm 5 continues the lead-in operation, similar to the case of the automatic lead-in operation for programmed playing. At the time $t_4$ that the output (q) is transmitted from the DD area sensor 34, the terminals 26 (m) and 28 (o) of the system controller 51 are set to the L level, thereby causing the DD drive system 19 to start. Hence, changeover from the mechanical drive system 7 to DD drive system is effected. The mechanical drive system 7 is set to its stand-by state just prior to the time that the pickup arm 5 is to be lowered. The movement of the pickup arm 5 is continued in the lead-in direction at high speed until the time $t_5$ when the output (r) corresponding, for instance, to the 103rd pulse from the address A sensor 32 is inputted to the terminal 12 of the system controller 51. The terminal 26 (m) is then set to the L level, thereby causing the speed of the pickup arm to be changed to low speed.

The pickup arm continues the lead-in operation at low speed until a time $t_6$ when, for instance, the 105th pulse, correspondng to the position of the lead-in groove for a 30 cm LP record, is reached. At that point, the terminal 28 (o) of the system controller 51 is set to the H level. When the DD drive system 19 is consequently stopped, the pickup arm 5 is stopped in the up position awaiting manual playing.

Next, by activating the LOWER key, the terminal 8 (j) of the system controller 51 is set to the L level. Simultaneously, the motor 9 (i) of the mechanical drive system 7 rotates in the direction appropriate to cause lowering of the pickup arm 5. At this time, the light-emitting diode UP (w) is extinguished. At time $t_8$ when the cam portion 8a of the rotor member 8 in the mechanical drive system 7 is turned ON, the switch 43 (i) is closed. The terminal 9 (k) of the system controller 51 is then set to the L level, thereby stopping the mechanical drive system 7. Simultaneously, the mute signal (b) outputted on the terminal 2 is set to the L level, thereby turning the muting relay 88 OFF and setting the system in conditions appropriate for manual playing.

If the START has been kept depressed at time $t_9$ during playing, a search operation is commenced as follows. First, the terminal 8 (j) of the system controller 51 is set to the H level and the motor 9 (i) of the mechanical drive system 7 is set to rotate in the direction which causes the pickup arm to be lifted. Simultaneously, the light-emitting diode START (v) and the light-emitting diode UP (w) are activated. Also, the mute signal (b) is outputted in the H state on the terminal 2, thereby turning ON the muting relay 88. At time $t_{10}$ when the switch 42 is turned ON, the terminal 9 (k) of the system controller is turned ON, and the terminal 9 (k) of the system controller 51 is set in the H state, thereby causing the motor 9 (j) of the mechanical drive system 7 to stop and halt the lifting of the pickup arm 5. Subsequently, the terminal 27 (n) is set to the L level, thereby causing the start of the DD drive system 19.

Subsequently, the pickup arm 5 is made to travel at low speed toward the inside of the record for performing the search operation.

The light-emitting diode START (v) continues to flash while the START key is depressed from the time of commencement of the search operation. At the time $t_{11}$ when the START key is depressed, the terminal 27 (n) of the system controller is set to the H level, thereby stopping the DD drive system 19. Consequently, the pickup arm 5 is made to halt in its upper position. Then the light-emitting diode START is stopped from flashing. By depressing the LOWER key at time $t_{12}$, the pickup arm 5 is lowered at time $t_{13}$ in accordance with the operational sequence described above.

Further, if the STOP key is held down during the search operation, the terminal 28 (o) of the system controller 51 is held at the L level. After the finish of the pickup arm lifting operation, the pickup arm 5 is made to travel at low speed toward the outer edge of the record.

If the pickup arm 5 exceeds the DD drive range, the mechanical drive system starts to automatically return the pickup arm 5 to the rest position. This forced return operation is used not only in the case where the normal DD drive range is exceeded, but also in the case that an optionally set drive range is exceeded.

At the time when the stylus 48 reaches a point near the lead-out groove during record playing, the output (p) from the sensor 35 at the L level is applied to the terminal 10 of the system controller 51. As soon as the stylus 48 enters the lead-out groove and the speed of the pickup arm 5 correspondingly increases, the end of record playing is detected based on the outputs (r) and (s) from the sensors 32 (a) and 32 (b).

At the time $t_{14}$ when the end of play is detected, the terminal 8 (j) of the system controller 51 is set in the H state. The terminal 9 remains in the L state. Thereby, a lifting operation of the pickup arm 5 is instructed. At this time, the light-emitting diode UP (w) is activated, and simultaneously the mute signal (b) is outputted in the H state, thereby turning ON the muting relay 88 and hence breaking the audio signal circuit. After the lifting operation of the pickup arm 5 has been completed, the pickup arm 5 is made to automatically return to the rest position with the use of the mechanical drive system 7.

At the time $t_{16}$ when the pickup arm 5 returns to the rest position, the rest position detection switch 44 (a) is turned ON. At time $t_{17}$, a predetermined time after time $t_{16}$, the terminal 9 (k) of the system controller 51 is set in the H state, thereby stopping the mechanical drive system 7 for the automatic return operation. At this time, the terminal 4 (c) of the system controller 51 is set in the H state, thereby stopping the motor 55.

By depressing the OPEN/CLOSE button at time $t_{18}$, the terminal 7 (g) of the system controller 51 is set to the L level. In response to actuation of this key, the motor 60 is made to rotate in the closing direction, thereby causing the base 4 to be retracted into the player body. At time $t_{19}$ when the closed detection which 63 (d) has been turned ON by activation by the slide base 4, the system controller sets the terminal 7 (g) to the H level, thereby stopping the motor 60 and hence ending the closing operation. After this, all operations are put in stand-by conditions for the next cycle of playing.

Figure 18B:
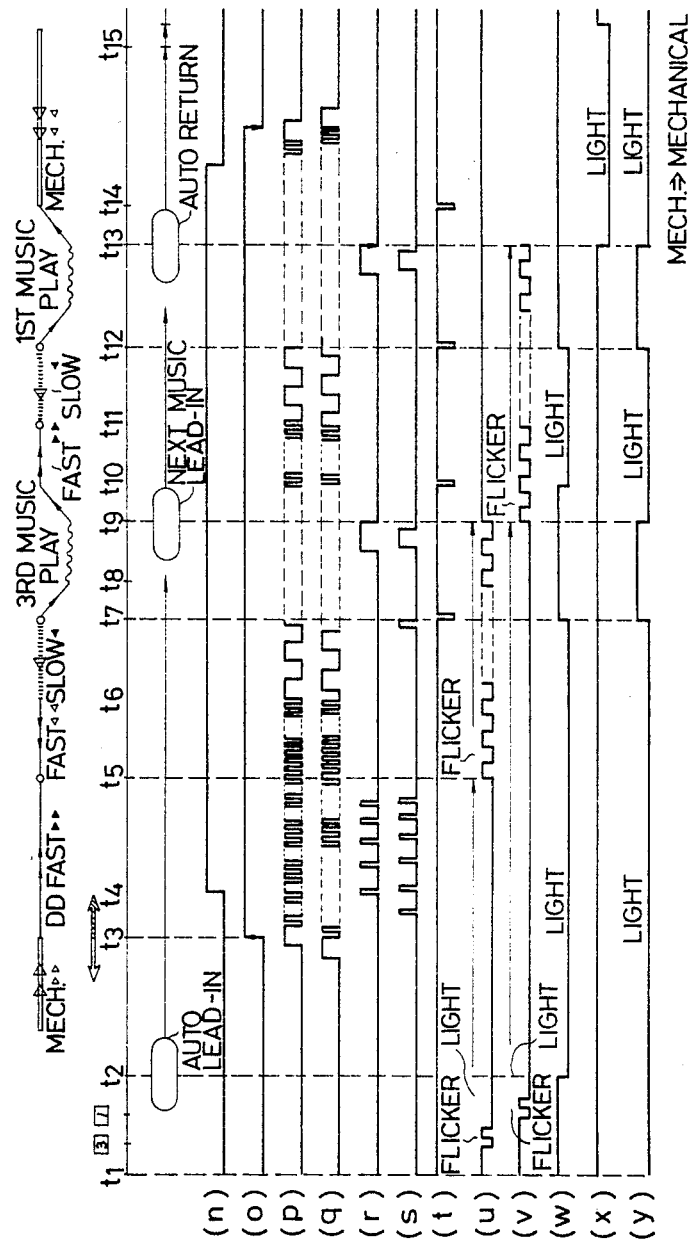

When music is to be recorded on a tape deck (not shown), a deck synchro operation is performed during both programmed and manual playing. To use this mode, the synchro output terminal 62 (FIG. 11) is connected to the remote pause terminal of the tape deck. During programmed playing, an L level output is transmitted from the terminal 25 of the system controller 51 at times $t_7$, $t_{10}$ and $t_{12}$, corresponding to the times of tone arm lifting, as indicated in FIG. 18B. The deck repeats alternate pause/recording operations for each pulse inputted to the pause input terminal. This is done in such a manner that the pause operation can be released only during the playing of a music portion of a record. Thus, only reproduced voice or music is recorded on the tape. When the player is in the manual playing mode, as illustrated in FIG. 21B, a synchro output (u) is generated at times $t_7$, $t_{10}$, $t_{12}$ and $t_{15}$, thereby permitting recording only during playing operations.

In the description above, it is assumed that an offset type pickup arm is employed. However, the present invention as applicable as well to a case where a linear tracking arm is employed.

As described in detail herein, according to the present invention a drive system for a pickup arm is provided including a first drive system which mechanically drives the pickup arm and a second drive system which drives the pickup arm using an electromagnetic force. One of the two drive system is selected in accordance either with a selected operational mode or the operational position of the pickup arm. Optimum operation of the pickup arm is thereby provided.

More specifically, if the distance to which the pickup arm is to travel without stopping is great, the mechanical drive system is employed. Then, when the pickup arm is near a position where it is to be stopped, changeover is made to the second system, there enabling very actuate detection of the position where the pickup arm is to be stopped. Hence, optimum efficiency in moving the pickup arm is provided.

We claim:

1. A drive system for a pickup arm, comprising:
   first pickup arm driving means comprising a mechanical movement including a first rotor and gear transmission means for transmitting torque from a drive motor to said first rotor;
   second pickup arm driving means comprising an electromagnetic drive including a magnetic second rotor and a plurality of drive coils for receiving drive current;
   and means for selectively activating one of said first and second driving means such that the movement of said tone arm in a horizontal direction is selectively separately effected by said first driving means and by said second driving means, at respectively different times, in accordance with one of a selected operational mode and a position of said pickup arm.

2. A drive system as claimed in claim 1, wherein said first driving means comprises a driving motor, a rotor member and a transmission between said motor and said rotor.

3. A drive system as claimed in claim 2, wherein said rotor includes latch means for driving said pickup arm from a rest position to a location proximate a record center.

4. A drive system as claimed in claim 3, said latch means including oscillating arm means for disengaging the driving of said pickup arm by said latch means.

5. A drive system as claimed in claim 1, wherein said second driving means includes a movable magnet associated with said pickup arm, fixed drive coil means proximate said magnet, and a horizontal drive circuit for energizing said fixed drive coil means.

6. A drive system as claimed in claim 5, further including a speed detection coil arranged together with said fixed drive coil means for measuring the speed of said pickup arm.

7. A drive system as claimed in claim 5, further including indicator means mounted for rotation with said pickup arm and including position detection means.

8. A drive system as claimed in claim 7, said indicator means further including a pickup arm drive pin secured thereto.

9. A drive system as claimed in claim 7, said indicator means comprising a rotatable plate provided with an array of slits, and at least a pair of address sensors adjacent said slits for monitoring the position of said pickup arm.

10. A drive system as claimed in claim 9, said address sensors being arranged confronting said slits at least during a predetermined arc within the range of arcuate movement of said pickup arm.

11. A drive system as claimed in claim 1, wherein said driving means activating means comprises changeover control means including an electromagnetic driving system range sensor for controlling changeover from said first driving means to said second driving means during horizontal movement of said pickup arm during a pickup arm lead-in operation.

12. A drive system as claimed in claim 2, wherein said rotor member includes arm lifter cam means for raising and lowering said pickup arm.

13. A drive system as claimed in claim 11, further including inter-music sensor means positioned near an end of said pickup arm, system controller means, and means interfacing said inter-music sensor means and said system controller means.

14. A drive system as claimed in claim 13, said interfacing means comprising a differential amplifier receiving an output of said inter-music sensor means, and a zero crossing amplifier and an inter-music comparator coupled to said differential amplifier.

15. A drive system as claimed in claim 13, said system controller receiving inputs from at least said intermusic sensor means, said address sensors and said range sensor, and operating to control said first driving means at selected intervals for moving said pickup arm both horizontally and vertically, and operating to control said second driving means at selected intervals at least within a predetermined arc of movement of said pickup arm corresponding to a playing range of an associated recording, for horizontal movement of said pickup arm.

* * * * *